United States Patent [19]
Iwaida et al.

[11] Patent Number: 5,949,637
[45] Date of Patent: Sep. 7, 1999

[54] CURRENT COLLECTOR FOR ELECTRIC DOUBLE-LAYER CAPACITOR

[75] Inventors: Manabu Iwaida; Eisuke Komazawa; Minoru Noguchi; Kazuo Andou, all of Wako, Japan

[73] Assignee: Honda Giken Kogyo Kabushiki Kaisha, Tokyo, Japan

[21] Appl. No.: 09/050,029

[22] Filed: Mar. 30, 1998

[30] Foreign Application Priority Data

Apr. 8, 1997 [JP] Japan ................................ 9-089092

[51] Int. Cl.⁶ ............................ H01G 9/016; H01G 9/155; H01G 9/004
[52] U.S. Cl. ............................ 361/502; 361/523; 361/533
[58] Field of Search ...................... 361/502, 508, 361/509, 503, 301.1, 306.2, 306.3, 523, 524, 520, 540, 533, 532, 528, 531; 439/65, 80, 66, 67

[56] References Cited

U.S. PATENT DOCUMENTS

| 5,567,167 | 10/1996 | Hayashi ................................ 439/75 |
| 5,742,474 | 4/1998 | Shimizu et al. ........................ 361/502 |

FOREIGN PATENT DOCUMENTS

| 64-9611 | 1/1989 | Japan . |
| 1-140709 | 6/1989 | Japan . |
| 7-142091 | 6/1995 | Japan . |
| 7-320987 | 12/1995 | Japan . |
| 9-134726 | 5/1997 | Japan . |

*Primary Examiner*—Kristine Kincaid
*Assistant Examiner*—Eric W. Thomas
*Attorney, Agent, or Firm*—Nikaido, Marmelstein, Murray & Oram LLP

[57] ABSTRACT

A current collector for use in an electric double-layer capacitor is constructed such that it is held in intimate contact with the electrodes thereby reducing the internal resistance and providing for better charging and discharging characteristics. The current collector includes an electrically conductive metal foil having a plurality of through holes defined therein and a plurality of pointed bars projecting from edges of each of the through holes perpendicularly to the electrically conductive metal foil. The pointed bars extend through electrodes disposed on opposite surfaces of the current collector. Distal end portions of the pointed bars are bent over against the outer surfaces of the electrodes. The bent distal end portions hold the electrodes under pressure against the current collector so that the current collector and the electrodes are tightly fastened together. Preferably, the electrically conductive foil includes aluminum foil and each of the electrodes contains activated carbon.

3 Claims, 5 Drawing Sheets

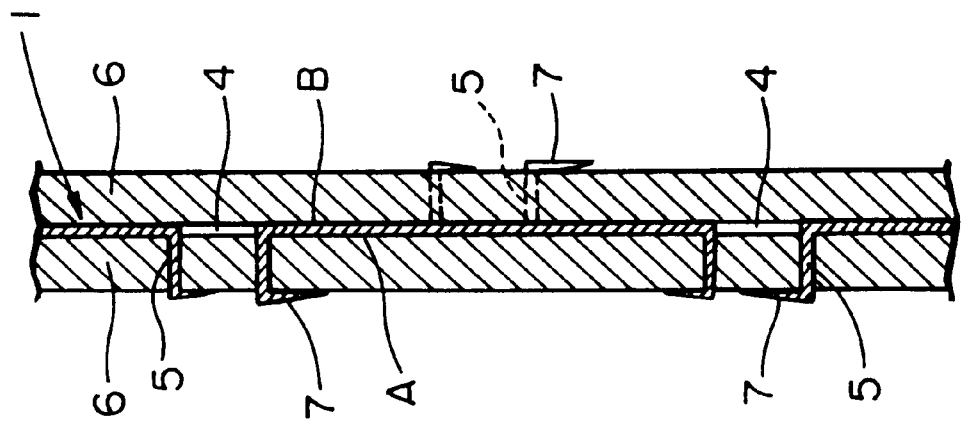
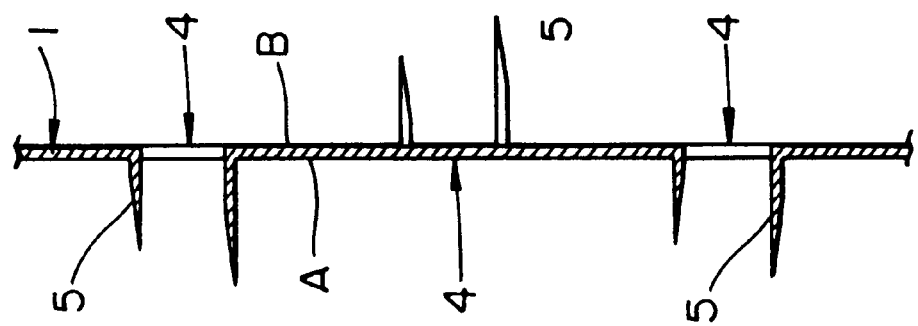

CURRENT COLLECTOR FOR ELECTRIC DOUBLE-LAYER CAPACITOR

BACKGROUND OF THE INVENTION

1. Field of the Invention

The present invention relates to a current collector for use in an electric double-layer capacitor.

2. Description of the Related Art

As shown in FIG. 6, an electric double-layer capacitor comprises anode electrodes 12 having respective anode current collectors 11 and cathode electrodes 14 having respective cathode current collectors 13. The anode and cathode electrodes 12, 14 in each pair are disposed in confronting relation to each other with a separator 15 interposed therebetween, and jointly make up a basic cell 16. Adjacent basic cells 16 are arranged such that electrodes of like polarity share one current collector. Specifically, the anode electrode 12 of a certain basic cell 16 and the anode electrode 12 of an adjacent basic cell 16 share an anode current collector 11, and the cathode electrode 14 of a certain basic cell 16 and the cathode electrode 14 of an adjacent basic cell 16 share a cathode current collector 13. A plurality of basic cells 16 are stacked into a capacitor assembly 17. On one outermost side of the capacitor assembly 17, there is a separator 15 disposed on an anode current collector 11. On the opposite outermost side of the capacitor assembly 17, there is a separator 15 disposed on a cathode current collector 13.

Each of the anode and cathode electrodes 12, 14 comprises a thin plate of activated carbon. Each of the separators 15 comprises a sheet of fluoroplastic. Each of the anode and cathode current collectors 11, 13 comprises an electrically conductive metal foil which may be of aluminum or the like. Anode leads 18 and cathode leads 19 extend from upper ends of the anode and cathode current collectors 11, 13, respectively. The anode leads 18 and cathode leads 19 are combined and connected to respective electrode terminals. The capacitor assembly 17 is housed in a case (not shown), which is supplied with an electrolytic solution and then sealed, thereby producing the electric double-layer capacitor.

In the electric double-layer capacitor, the current collectors are not securely fixed to the electrodes. Therefore, when the electric double-layer capacitor vibrates, the current collectors and the electrodes tend to be relatively displaced out of intimate contact with each other, increasing the internal resistance of the electric double-layer capacitor.

One electric double-layer capacitor in which current collectors are attached to electrodes is disclosed in Japanese laid-open patent publication No. 64-9611. In the disclosed electric double-layer capacitor, an electrode is placed on a current collector in the form of an aluminum foil, and is embossed or drilled from the side of the aluminum foil, thus forming through holes in the electrode. The current collector has torn portions projecting along the inner peripheral edges of the through holes. Japanese laid-open patent publication No. 7-142091 reveals an electric double-layer capacitor including a current collector which comprises a metal sheet. The current collector is ripped to form holes with edge burrs extending from its face side to its back side. The current collector is pressed against an electrode of pelletized material which is penetrated by ends of the edge burrs.

According to Japanese laid-open patent publication No. 64-9611, portions of the current collector only project along the inner peripheral edge of the through holes. According to Japanese laid-open patent publication No. 7-142091, the edge burrs of the current collector only penetrate the electrode. Therefore, both the disclosed current collectors are disadvantageous in that when the electrode absorbs the electrolytic solution and is expanded thereby, the projecting portions or the penetrating edge burrs are liable to be pulled out, permitting the current collector to lose intimate contact with the electrode. Furthermore, according to Japanese laid-open patent publication No. 64-9611, since the through holes are defined in the electrode, the volume of the activated carbon of the electrode is less than would be if no through holes are defined in the electrode, resulting in a reduction in the electric capacitance of the electric double-layer capacitor.

SUMMARY OF THE INVENTION

It is therefore an object of the present invention to provide an electric double-layer capacitor which has current collectors and electrodes that are held in intimate contact with each other for a low internal resistance.

Another object of the present invention is to provide an electric double-layer capacitor which has good charging and discharging characteristics.

Still another object of the present invention is to provide an electric double-layer capacitor which has a large current collecting capability.

To achieve the above objects, there is provided in accordance with the present invention a current collector for use in an electric double-layer capacitor, comprising an electrically conductive metal foil having a plurality of through holes defined therein and a plurality of pointed bars projecting from edges of each of the through holes perpendicularly to the electrically conductive metal foil, the pointed bars being adapted to extend through an electrode disposed on the electrically conductive metal foil and having distal end portions adapted to be bent over against a surface of the electrode.

For attaching the electrode to the current collector, the electrode is pressed against the current collector, causing the pointed bars penetrate the electrode. The distal end portions of the pointed bars are bent over against an outer surface of the electrode. The bent distal end portions hold the electrode under pressure against the current collector. The size and shape of the through holes and the height of the projected bars are adjusted depending on the thickness and size of the electrode. Since the current collector is held in intimate contact with and fixed to the electrode, a resultant electric double-layer capacitor has a relatively small internal resistance, and hence exhibits charging and discharging characteristics. The pointed bars extending through the electrode and the distal end portions thereof bent over against the outer surface of the electrode are effective to provide a relatively large current collecting capability.

The pointed bars may be disposed on opposite surfaces of the electrically conductive metal foil. The pointed bars may be adapted to extend through a pair of electrodes disposed respectively on the opposite surfaces of the electrically conductive metal foil and may have distal end portions adapted to be bent over against respective surfaces of the electrodes. With this arrangement, the electrodes, which are of like polarity, are pressed against respective face and back surfaces of the current collector, causing the pointed bars penetrate the electrodes. The distal end portions of the pointed bars are bent over against respective outer surfaces of the electrodes. The bent distal end portions hold the electrodes under pressure against the current collector, so that the current collector and the electrodes are combined into a tightly fastened assembly. The assembly with the current collector interposed between the electrodes provides a relatively large current collecting capability.

Preferably, the electrically conductive metal foil comprises an aluminum foil and each of the electrodes contains activated carbon. Even when the electrodes of activated carbon are expanded by an absorbed electrolytic solution, the electrodes and the current collector remain in highly intimate contact with each other due to the bent distal end portions of the pointed bars. Therefore, the resultant electric double-layer capacitor keeps a relatively small internal resistance.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 2 is an enlarged cross-sectional view taken along line II—II of FIG. 1;

FIG. 3 is an enlarged fragmentary cross-sectional view of the current collector combined with electrodes;

DETAILED DESCRIPTION OF THE PREFERRED EMBODIMENT

Figure 1:
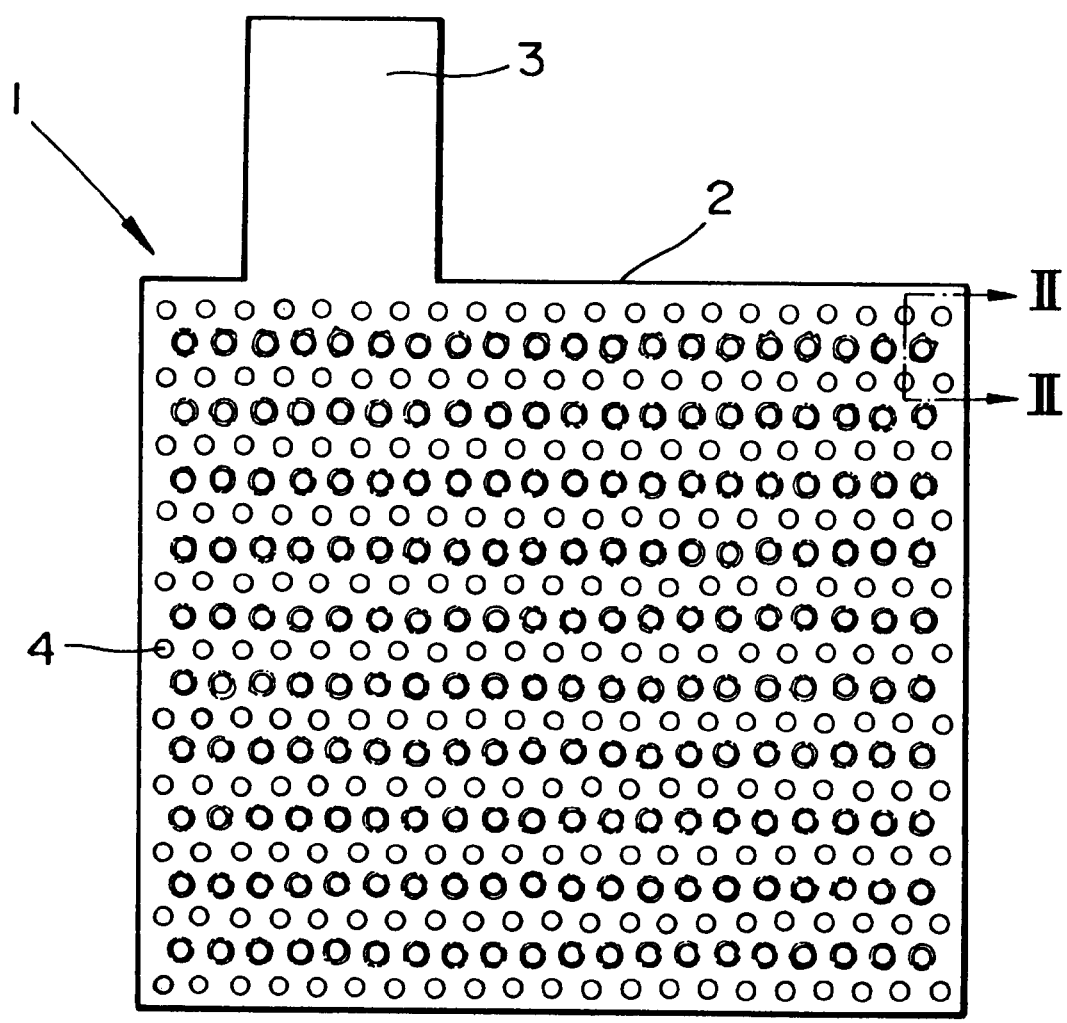
FIG. 1 is a front elevational view of a current collector for use in an electric double-layer capacitor according to the present invention.

As shown in FIG. 1, a current collector 1 for use in an electric double-layer capacitor according to the present invention comprises a thin sheet in the form of an electrically conductive metal foil which may be of aluminum or the like. The current collector 1 includes a rectangular current collecting element 2 and a rectangular lead 3 extending from an upper edge of the current collecting element 2. The current collecting element 2 has a plurality of through holes 4 defined therein which are arranged in a matrix of horizontal rows and vertical columns. The through holes 4 of two adjacent horizontal rows are horizontally staggered with respect to each other.

As shown in FIG. 2, the current collecting element 2 has pointed bars 5 projecting from edges of each of the through holes 4 perpendicularly to the plane of the current collector 1. The pointed bars 5 that project from edges of a vertical column of through holes 4 are disposed alternately on face and back surfaces A, B of the current collector 1. The through holes 4 and the printed bars 5 may be formed when the current collector 1 is punched or burred from the face surface A or the back surface B. The shape and size of the through holes 4 and the height of the pointed bars 5 are adjusted depending on the size and thickness of electrodes to be attached to the current collector 1, and a punch or similar tool depending on the shape and size of the through holes 4 and the height of the pointed bars 5 is used to form the through holes 4 and the printed bars 5.

As shown in FIG. 3, two electrodes 6 of like polarity, e.g., anode electrodes or cathode electrodes, are attached respectively to the face and back surfaces A, B of the current collector 1. For installing the electrodes 6 on the current collector 1, the electrodes 6 are held respectively against the face and back surfaces A, B of the current collector 1. Then, the electrodes 6 are pressed respectively against the face and back surfaces A, B by pressing plates (not shown) until the pointed bars 5 penetrate and are forced through the electrodes 6. The pressing plates are further pressed to bend distal end portions 7 of the pointed bars 5 over against the outer surfaces of the electrodes 6, thereby holding the electrodes 6 into intimate contact with the current collector 1 sandwiched therebetween. Therefore, the current collector 1 and the electrodes 6 are combined into a tightly fastened assembly.

Figure 6:
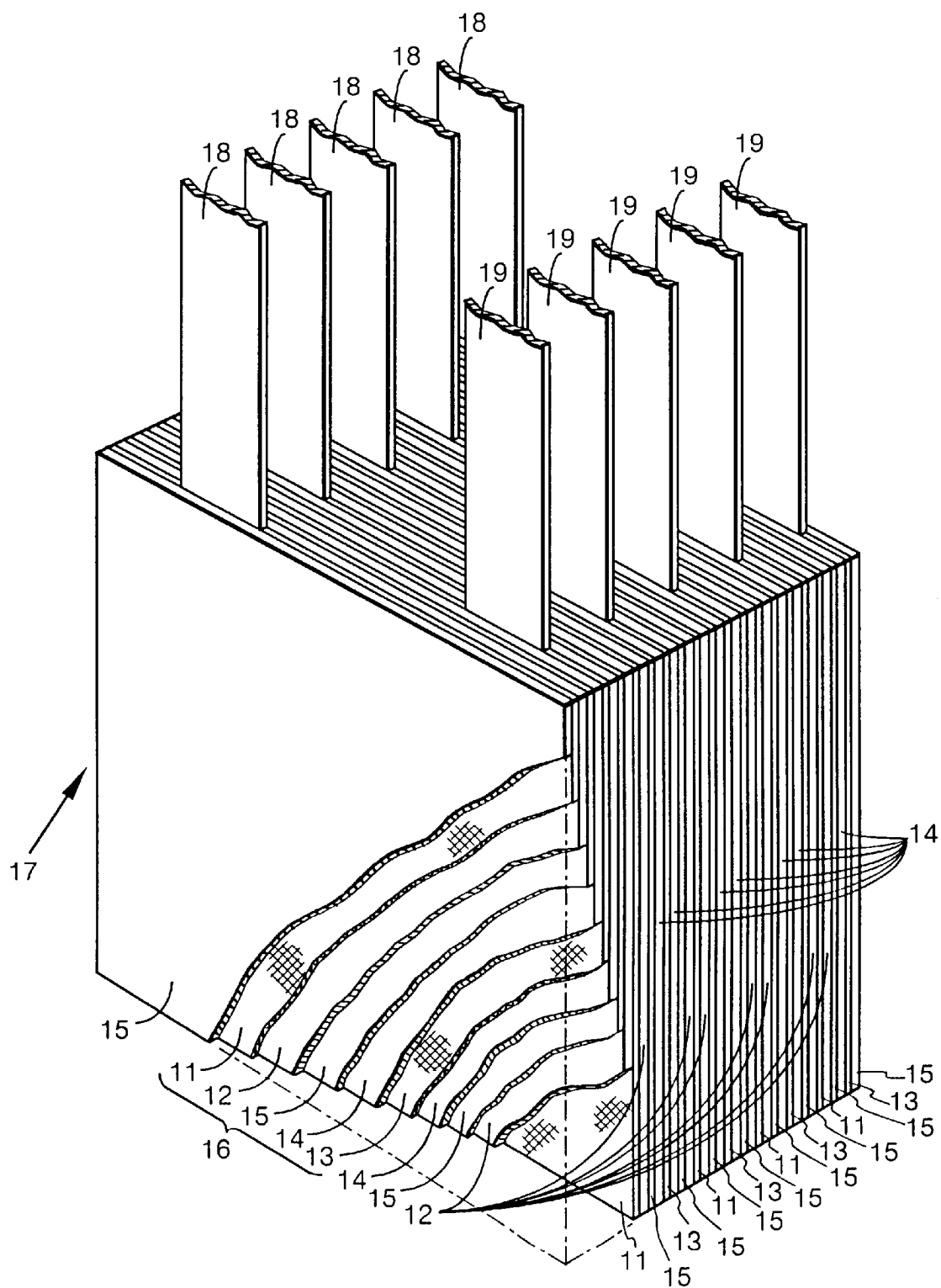
FIG. 6 is a perspective view, partly broken away, of a conventional electric double-layer capacitor.

Electric double-layer capacitors comprising current collectors 1 and electrodes 6 and structured as shown in FIG. 6 were tested for charging and discharging characteristics.

Specifically, two electric double-layer capacitors (Inventive Examples 1 and 2) were manufactured. In each of Inventive Examples 1 and 2, the current collector 1 comprised a thin sheet such as an aluminum foil having a thickness of 0.05 mm, and had a vertical dimension (height) of 40 mm, a horizontal dimension (width) of 40 mm, and a thickness of 0.05 mm. Each of the through holes 4 defined in the current collector 1 was of a substantially circular shape having a diameter of about 1.8 mm. In Inventive Example 1, the pointed bars 5 had an average height of 0.9 mm, and in Inventive Example 2, the pointed bars 5 had an average height of 0.6 mm.

In each of Inventive Examples 1 and 2, each of the electrodes 6 comprised a thin plate of activated carbon. Specifically, each of the electrodes 6 was made of 85.5% by weight of activated carbon (Tradename "20SPD" manufactured by Kansai Netsukagaku Co.), 2.5% by weight of a binder (Tradename "Teflon 6J" manufactured by Mitsui Du Pont fluorochemicals Co.), and 12% by weight of an electrically conductive filler (acetylene black). Each of the electrodes 6 was manufactured by kneading the mixture of the above materials with a double-screw kneader for 10 minutes, rolling the kneaded mixture into a sheet, and shaping the sheet to desired dimensions. Each of the electrodes 6 had a vertical dimension (height) of 40 mm, a horizontal dimension (width) of 40 mm, and a thickness of 0.05 mm.

In each of Inventive Examples 1 and 2, each separator 15 (see FIG. 6) was manufactured by cutting off an oriented film of polytetrafluoroethylene (Tradename "JMWP" manufactured by Millipore Co.) which was made hydrophilic, into a thin sheet having a vertical dimension (height) of 40 mm, a horizontal dimension (width) of 40 mm, and a thickness of 0.05 mm. The electrolytic solution was an organic solvent in the amount of one mol/liter of $(C_2H_5)_4NBF_4PC$ (a propylene carbonate solution of tetraethylammonium and tetrafluoroborate). The electrolytic solution was poured into a capacitor case in a gloved box in which a highly pure Ar gas was circulated, and then the capacitor case was closed.

For comparison with the electric double-layer capacitors according to Inventive Examples 1, 2, two other electric double-layer capacitors according to Comparative Examples 1, 2 were manufactured. In Comparative Example 1, each current collector 1 had pointed bars 5 having an average height of 0.3 mm, and in Comparative Example 2, each current collector comprised an aluminum foil having a thickness of 0.05 mm and free of through holes and pointed bars. Other details of the electric double-layer capacitors according to Comparative Examples 1, 2 were identical to those of the electric double-layer capacitors according to Inventive Examples 1, 2.

The electric double-layer capacitors according to Inventive Examples 1, 2 and Comparative Examples 1, 2 were repeatedly charged and discharged with a charging voltage of 2.3 V, a discharging voltage of 0 V, and a current density of 1.66 mA/cm$^2$ upon being charged and discharged, and checked for their internal resistances. The internal resistance of each of the electric double-layer capacitors was calculated on the basis of a voltage drop developed upon a shift from a charging mode to a discharging mode on the charging and discharging curve of the capacitors.

Figure 4:
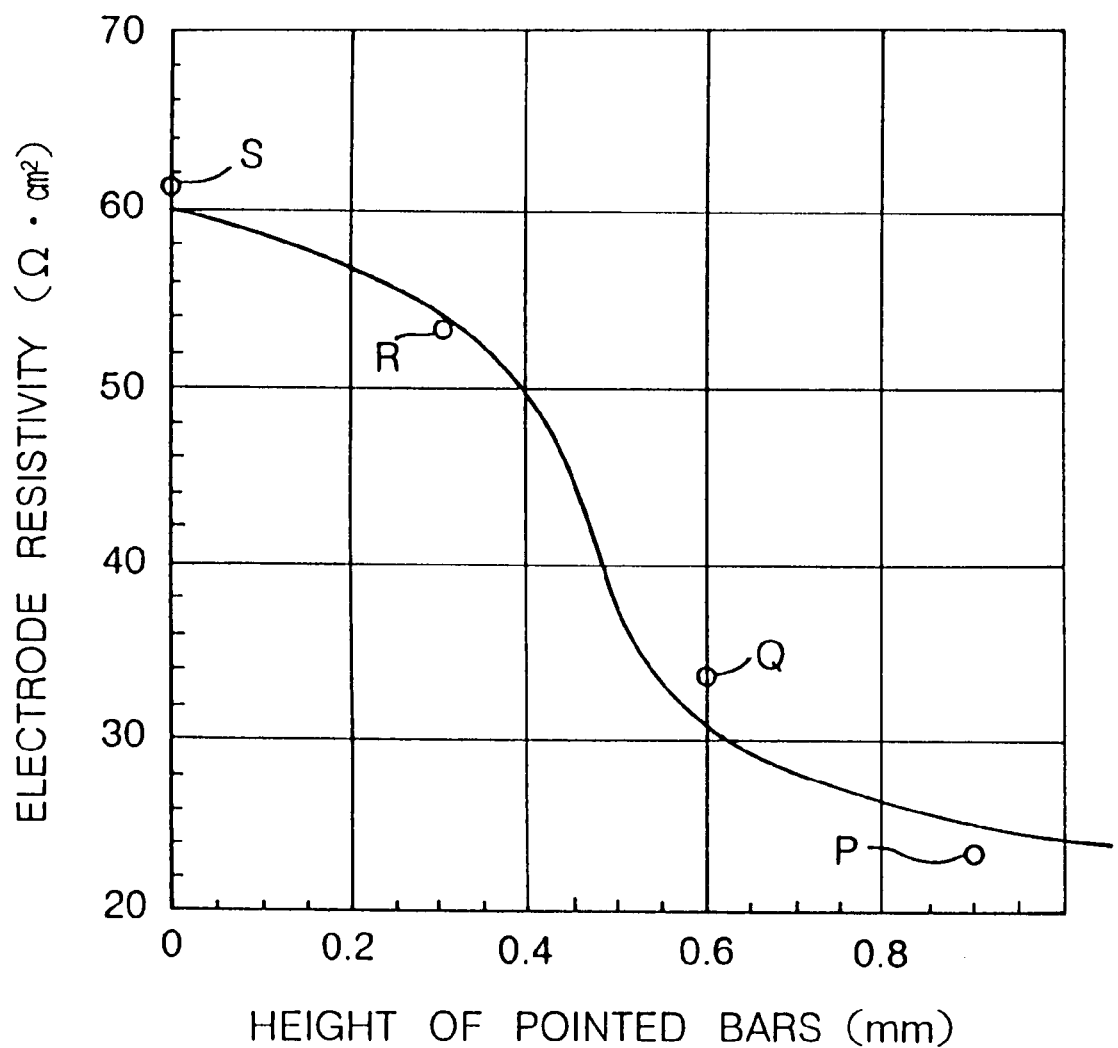
FIG. 4 is a diagram showing the relationship between the height of pointed bars of the current collector and the internal resistance of electric double-layer capacitors (the resistivity of the electrodes) according to Inventive and Comparative Examples.

The results of the test are shown in FIG. 4. FIG. 4 shows the relationship between the height of pointed bars 5 of the current collector 1 and the internal resistance of the electric double-layer capacitors (the resistivity of the electrodes) according to Inventive Examples 1, 2 and Comparative Examples 1, 2. In FIG. 4, points P, Q, R, S represent the electric double-layer capacitor in which the pointed bars 5 had an average height of 0.9 mm (Inventive Example 1), the electric double-layer capacitor in which the pointed bars 5 had an average height of 0.6 mm (Inventive Example 2), the electric double-layer capacitor in which the pointed bars 5 had an average height of 0.3 mm (Comparative Example 1), and the electric double-layer capacitor in which there were no pointed bars (Comparative Example 2), respectively. As can be seen from FIG. 4, the electric double-layer capacitors according to Inventive Examples 1, 2 in which the height of the pointed bars 5 was greater than the thickness of the electrodes 6 and the pointed bars 5 penetrated the electrodes 6 had resistivities much smaller than the electric double-layer capacitors according to Comparative Examples 1, 2 in which the height of the pointed bars 5 was smaller than the thickness of the electrodes 6 and the pointed bars 5 did not penetrate the electrodes 6. The resistivity of the Inventive Example 1 in which the height of the pointed bars 5 was greater (0.9 mm) was smaller than the resistivity of the Inventive Example 2 in which the height of the pointed bars 5 was smaller (0.6 mm).

An electric double-layer capacitor (Inventive Example 3) which was similar to the electric double-layer capacitor according to Inventive Example 1 except that each current collector 1 had a vertical dimension (height) of 135 mm and a horizontal dimension (width) of 65 mm, each electrode 6 had a vertical dimension (height) of 135 mm and a horizontal dimension (width) of 65 mm, and there were 90 electrodes 6 was manufactured. An electric double-layer capacitor (Comparative Example 3) in which each current collector was similar to that of Comparative Example 2, but was free of pointed bars, and in which each electrode had the same size as the electrode in Inventive Example 3 and there were 90 electrodes 6 was manufactured. The electric double-layer capacitors according to Inventive Example 3 and Comparative Example 3 were tested to measure changes in their electrostatic capacitances and resistances when a voltage of 2.4 V was applied to the capacitors continuously for 96 hours and then the electric double-layer capacitors were left to stand at a temperature of 70° C.

The results of the above test are shown in Table below. Table shows the values of electrostatic capacitances and resistances which were initially measured and also measured after an endurance test in which a voltage was continuously applied and then the electric double-layer capacitors were left to stand at a high temperature. The electrostatic capacitances shown in Table 1 were converted from amounts of energy when a constant current of 10 A was discharged from the electric double-layer capacitors, and the resistances shown in Table 1 were calculated on the basis of voltage drops developed when a constant current of 10 A was discharged from the electric double-layer capacitors.

TABLE

|  |  | Electrostatic capacitance (F) | Resistance (mΩ) |
| --- | --- | --- | --- |
| Inventive Example 3 | Initial | 1680 | 3.2 |
|  | After endurance test | 1310 | 4.7 |
| Comparative Example 3 | Initial | 1080 | 5.4 |
|  | After endurance test | 605 | 12.5 |

Figure 5:
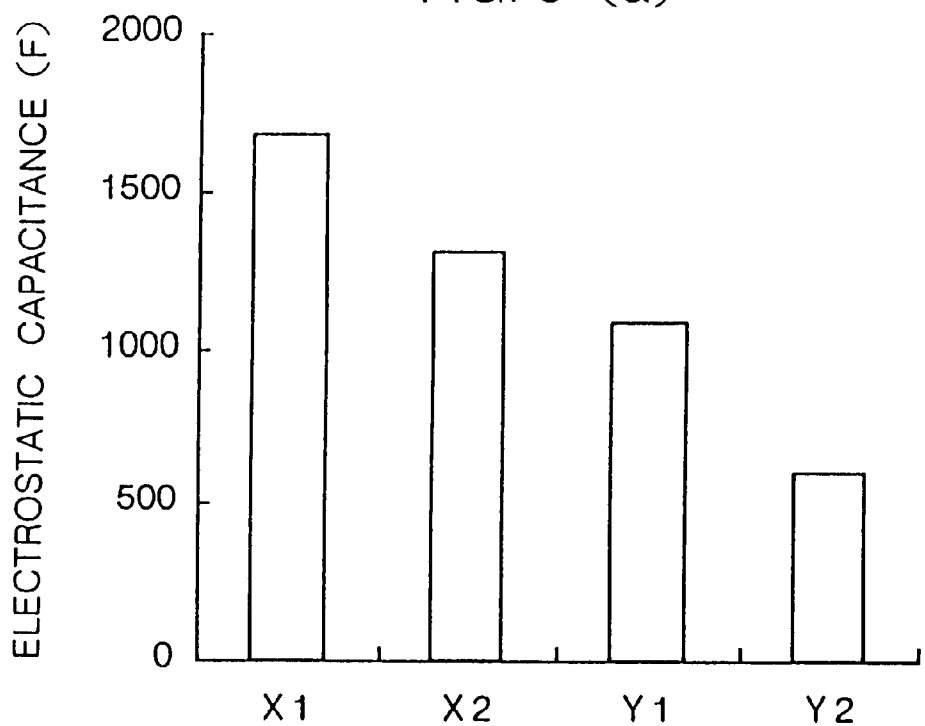
FIG. 5(a) diagram showing how the electrostatic capacitances of certain electric double-layer capacitors vary when they are left to stand at a high temperature while a voltage is being continuously applied to the electric double-layer capacitors.
FIG. 5(b) is a diagram showing how the internal resistances of the electric double-layer capacitors vary when they are left to stand at a high temperature while a voltage is being continuously applied to the electric double-layer capacitors.
Figure 5:
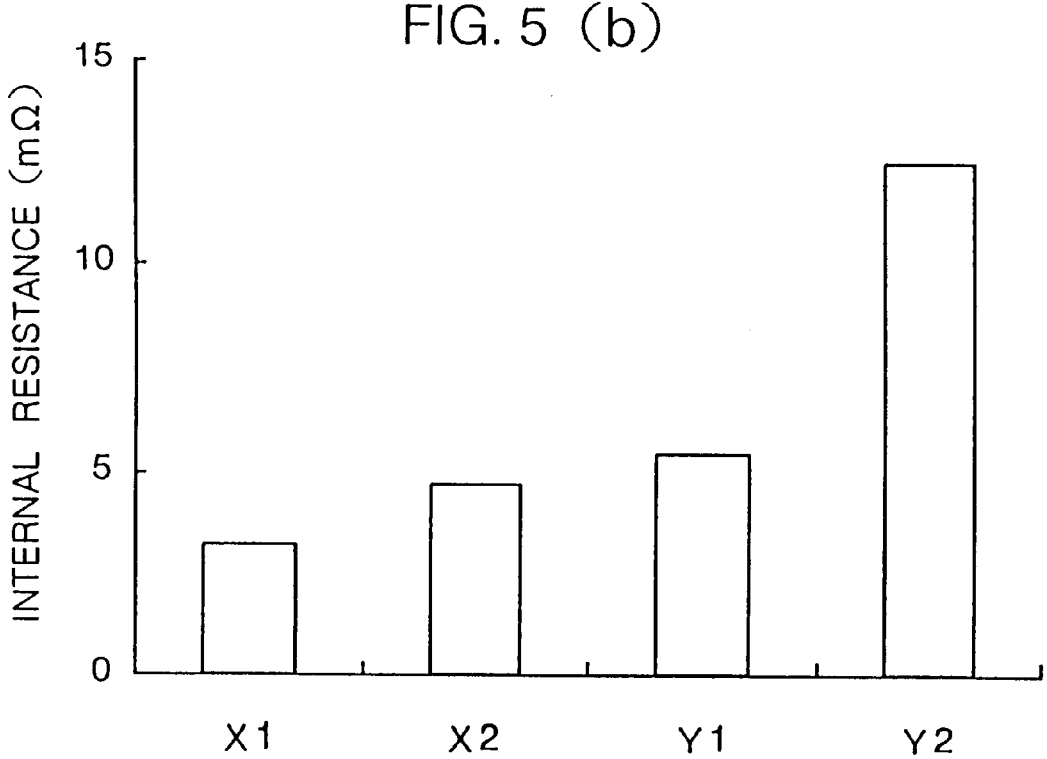

FIGS. 5(a) and 5(b) show how the electrostatic capacitances and internal resistances of the electric double-layer capacitors according to Inventive Example 3 and Comparative Example 3 vary when they are left to stand at a high temperature while a voltage is being continuously applied to the electric double-layer capacitors. In FIGS. 5(a) and 5(b), X1 represents the initial value of the electric double-layer capacitor according to Inventive Example 3, X2 the value after the endurance test of the electric double-layer capacitor according to Inventive Example 3, Y1 the initial value of the electric double-layer capacitor according to Comparative Example 3, and Y2 the value after the endurance test of the electric double-layer capacitor according to Comparative Example 3.

It will be seen from the above Table and FIGS. 5(a) and 5(b) that the initial electrostatic capacitance of the electric double-layer capacitor according to Inventive Example 3 was more than 1.5 times the initial electrostatic capacitance of the electric double-layer capacitor according to Comparative Example 3, and the initial internal resistance of the electric double-layer capacitor according to Inventive Example 3 was less than two-thirds of the initial electrostatic capacitance of the electric double-layer capacitor according to Comparative Example 3.

After the endurance test, the electrostatic capacitance of the electric double-layer capacitor according to Inventive Example 3 dropped from 1680 F. to 1310 F., resulting in a deterioration ratio (reduction ratio) of 78%, and the electrostatic capacitance of the electric double-layer capacitor according to Comparative Example 3 dropped from 1080 F. to 605 F., resulting in a deterioration ratio of 56%. Consequently, both the reduction rate and the reduction in the electrostatic capacitance of the electric double-layer capacitor according to Inventive Example 3 after the endurance test were smaller than those of the electric double-layer capacitor according to Comparative Example 3, indicating that the difference between the electrostatic capacitances of the electric double-layer capacitors according to Inventive Example 3 and Comparative Example 3 was greater after the endurance test than before the endurance test. After the endurance test, the internal resistance of the electric double-layer capacitor according to Inventive Example 3 increased from 3.2 mΩ to 4.7 mΩ, resulting in a deterioration ratio (increase ratio) of 147%, and the internal resistance of the electric double-layer capacitor according to Comparative Example 3 increased from 5.4 mΩ to 12.5 mΩ, resulting in a deterioration ratio (increase ratio) of 231%. Consequently, both the increase ratio and the increase in the internal resistance of the electric double-layer capacitor according to Inventive Example 3 after the endurance test were smaller than those of the electric double-layer capacitor according to Comparative Example 3, indicating that the difference between the internal resistances of the electric double-layer capacitors according to Inventive Example 3 and Comparative Example 3 was greater after the endurance test than before the endurance test.

In the illustrated embodiment, as shown in FIG. 1, the through holes 4 defined in the current collector 1 are arranged in a matrix of horizontal rows and vertical columns, and the through holes 4 of two adjacent horizontal rows are horizontally staggered with respect to each other. However, the through holes 4 may be arranged in any of various other patterns. Though the through holes 4 are shown as being of a substantially circular shape, they are not limited to the illustrated shape, but may be of a polygonal shape, for example.

While the pointed bars 5 that project from edges of a vertical column of through holes 4 are disposed alternately on the face and back surfaces A, B of the current collector 1, the pointed bars 5 may be disposed in an irregular pattern on the face and back surfaces A, B of the current collector 1. While the projected bars 5 are illustrated as being disposed on the both surfaces of the current collector 1, the projected bars 5 may be disposed on only one of the both surfaces of the current collector 1. In the illustrated embodiment, as shown in FIG. 3, all the pointed bars 5 extend through the electrodes 6 and their distal end portions 7 are bent over against the outer surfaces of the electrodes 6. However, the pointed bars 5 may have different lengths such that some of the pointed bars 5 may extend all the way through the electrodes 6, and the others may not extend through, i.e., may terminate short of the outer surfaces of, the electrodes 6.

Furthermore, an appropriate electrically conductive layer may be interposed between the current collector 1 and each of the electrodes 6, and the current collector 1 and the electrode 6 may be pressed against the interposed electrically conductive layer.

Although a certain preferred embodiment of the present invention has been shown and described in detail, it should be understood that various changes and modifications may be made therein without departing from the scope of the appended claims.

What is claimed is:

1. A current collector for use in an electric double-layer capacitor, comprising an electrically conductive metal foil having a plurality of through holes defined therein and a plurality of pointed bars projecting from edges of each of said through holes perpendicularly to said electrically conductive metal foil, said pointed bars extending through at least one electrode disposed on said electrically conductive metal foil, wherein the distal end portions of said pointed bars are bent over against a surface of said at least one electrode.

2. A current collector according to claim 1, wherein said bars are disposed on opposite surfaces of said electrically conductive metal foil, and wherein said at least one electrode is a pair of electrodes disposed respectively on said opposite surfaces of said electrically conductive metal foil, said pointed bars extending through said pair of electrodes and having said distal end portions bent over against the respective surfaces of said electrodes.

3. A current collector according to claim 1 or 2, wherein said electrically conductive metal foil comprises an aluminum foil and said electrode or said electrodes contain activated carbon.

* * * * *